United States Patent [19]
Berkun

[11] Patent Number: 5,901,809
[45] Date of Patent: May 11, 1999

[54] APPARATUS FOR SUPPLYING COMPRESSED AIR

[76] Inventor: Andrew Berkun, 2800 Montrose, Apt. 37, La Crescenta, Calif. 91214-3846

[21] Appl. No.: 08/863,862

[22] Filed: May 27, 1997

Related U.S. Application Data

[63] Continuation-in-part of application No. 08/436,841, May 8, 1995, abandoned.

[51] Int. Cl.$^6$ .................................. B60K 5/00; F25B 9/00
[52] U.S. Cl. .................................. 180/301; 62/6
[58] Field of Search .................................. 180/301; 62/6, 62/467, 498

[56] References Cited

U.S. PATENT DOCUMENTS

| | | |
|---|---|---|
| 3,757,808 | 9/1973 | Peterson et al. . |
| 4,158,145 | 6/1979 | Kartsounes et al. . |
| 4,453,948 | 6/1984 | Fasching . |
| 4,687,420 | 8/1987 | Bentley . |
| 4,711,275 | 12/1987 | Ford et al. . |
| 4,936,340 | 6/1990 | Potter et al. . |
| 4,961,441 | 10/1990 | Salter . |
| 5,020,977 | 6/1991 | Lucas . |
| 5,051,066 | 9/1991 | Lucas ..................................... 417/207 |
| 5,174,130 | 12/1992 | Lucas . |
| 5,231,336 | 7/1993 | van Namen . |
| 5,231,337 | 7/1993 | van Namen . |
| 5,263,341 | 11/1993 | Lucas . |
| 5,319,938 | 6/1994 | Lucas . |
| 5,357,757 | 10/1994 | Lucas ............................................ 62/6 |
| 5,515,684 | 5/1996 | Lucas et al. ................................. 62/6 |

*Primary Examiner*—Robert J. Oberleitner
*Assistant Examiner*—Melanie Talavera
*Attorney, Agent, or Firm*—Henricks, Slavin & Holmes LLP

[57] ABSTRACT

A compressor including a chamber having a standing acoustical wave therein, the wave having at least first and second velocity nodes, the first velocity node having a smaller cross-sectional area than the second velocity node, a high pressure inlet adapted to receive relatively high pressure gas, an inlet mechanism operably connected to the high pressure inlet and to the chamber, the inlet mechanism being associated with the first velocity node and adapted to supply pulses of the relatively high pressure gas to the chamber at a predetermined rate, at least one outlet valve associated with the second velocity node of the chamber and adapted to allow gas at a relatively low pressure to pass therethrough, and a low pressure inlet operably connected to the chamber.

24 Claims, 5 Drawing Sheets

APPARATUS FOR SUPPLYING COMPRESSED AIR

CROSS-REFERENCE TO RELATED APPLICATION

This application is a continuation-in-part of U.S. patent application Ser. No. 08/436,841, filed May 8, 1995, now abandoned.

BACKGROUND OF THE INVENTION

1. Field of Invention

The present invention relates generally to supplying compressed gas and, more particularly, to a device which uses a relatively high pressure gas to produce a supply of lower pressure gas.

2. Description of the Related Art

Over the years, a variety of devices have been introduced which control the pressure of extremely high pressure compressed air and other gasses. One such device is a regulator. A regulator includes a controllable resistive aperture which is typically set to keep the output pressure (or flow rate) constant. In the resistive aperture, the high pressure air expands and converts its potential energy into kinetic energy. It also cools as it expands. At the far end of the regulator, the high velocity air is slowed by friction. The kinetic energy is converted to heat which warms the air back up. The exhaust temperature of a regulator is close to the intake temperature. Although regulators are relatively inexpensive and lightweight, they are also very energy inefficient. The potential energy difference between the intake and output gas is wasted as heat. As a result, they are typically used only to buffer gas flow in situations where energy conservation is not important.

Some commercial hydraulic equipment utilizes high pressure air with greater efficiency than a regulator. An example of this type of equipment is a dive shop compressor which is used to compress air to 2250 to 3000 PSI for use in SCUBA tanks. One can imagine the compressor being used in reverse as a compressed air motor which could be used to drive a high volume, low pressure air compressor. This type of compressor is, however, large and costly. A typical dive shop compressor capable of 30 horsepower and, possibly, 80% efficiency weighs upwards of 500 lbs. for the air handling section alone and costs $40,000 (the electric motor would add additional weight and cost). Such compressors also require extensive maintenance in that they need special oil and periodic seal replacement. They also have a relatively poor power to weight ratio.

Much of the expense and weight associated with hydraulic equipment is associated with the sliding seals. In order to operate under relatively high pressures, the seals must have very smooth surfaces, which requires expensive low tolerance machining. The sliding surfaces must also mate closely. Such mating requires thick, heavy pieces of metal that will not deform under the forces involved. To make up for imperfections in the machining process, a high viscosity oil is used. The high viscosity oil limits the speed of the high pressure compressor.

U.S. Pat. No. 5,174,130 discloses a compressor which uses an acoustical standing wave to compress refrigerant. The standing wave in this compressor has the same area at both nodes giving it the same pressure at both nodes. The wave is powered by electrical means and cannot be used as an energy transforming device.

SUMMARY OF THE INVENTION

Accordingly, the general object of the present invention is to provide a compressor which avoids, for practical purposes, the aforementioned problems. In particular, one object of the present invention is to provide an apparatus which efficiently uses a relatively high pressure gas to create a supply of lower pressure gas.

In order to accomplish these and other objectives, an apparatus in accordance with a preferred embodiment of the present invention includes a chamber having a standing acoustical wave therein, the wave having at least first and second velocity nodes, the first velocity node having a smaller cross-sectional area than the second velocity node, a high pressure inlet adapted to receive one of a relatively high pressure gas and a liquefied gas, an inlet mechanism operably connected to the high pressure inlet and to the chamber, the inlet mechanism being associated with the first velocity node and adapted to supply pulses of the relatively high pressure gas to the chamber at a predetermined rate, at least one outlet valve associated with the second velocity node of the chamber and adapted to allow gas at a relatively low pressure to pass therethrough, and a low pressure inlet operably connected to the chamber.

The present invention provides a number of advantages over the prior art. For example, the present invention provides a lightweight mechanism for efficiently transforming high pressure air to a lower pressure. This makes portable equipment powered by stored air possible. The high pressure air may be stored in bottles that can hold relatively large amounts of energy, while the low pressure air may be easily transformed into mechanical energy. Low pressure motors, for example, are controllable, reliable, and have long lifetimes. Additionally, the present invention is not heavy and slow, as is traditional high pressure hydraulic equipment, because the present invention does not require the thick, heavy seals and high viscosity oil associated with hydraulic equipment. To the contrary, the present invention allows the energy associated with high pressure air to be efficiently transformed into work with a lightweight high power motor.

One application for the present compressor is as an automotive power plant. An automobile equipped with the present compressor could, for example, also include four adiabatic reversible motors and several high pressure air tanks. A diver's bottle weighing about 35 lbs., for example, holds 80 cubic feet of ambient air at 3000 PSI. Assuming 100% efficiency, this translates to 0.455 horsepower hours if expanded isothermally. Sixty of these bottles would weigh 2100 lb. and hold 27.3 horsepower hours, which is enough energy to propel a small car at freeway speeds for about 3 hours (or a range of about 180 miles). A conventional automobile could accommodate the weight of the bottles if its engine, transmission, and fuel tank were removed. For longer range requirements, air tanks can be replaced by a large Dewar bottle of liquid nitrogen. Liquid nitrogen is widely available, affordable and can be stored in a lightweight container. It is possible to convert cold liquid nitrogen at low pressure into an extremely high pressure gas. The lighter weight of the Dewar bottle makes it possible to carry much more energy than compressed air bottles. It should be noted, however, that the present methods of creating the liquid nitrogen are not particularly energy efficient, thereby reducing the efficiency of the overall system.

An automobile in accordance with the present invention would have several advantages over gasoline powered automobiles. For example, an automobile in accordance with the present invention would generate no pollution and could have energy recovery brakes to provide longer range under city driving conditions. Certain portions of the present compressor run cold and can be used to cool air. Thus, the automobile's air conditioner would use no refrigerant, thereby protecting the ozone. Additionally, the automobile would need no transmission and could have the equivalent of full time four wheel drive. It could be designed for greater acceleration and traction than that which is currently possible with conventional gasoline powered automobiles. The present automobile would also convert its energy into motion with much greater efficiency than a gasoline powered automobile.

An automobile in accordance with the present invention also has a number of advantages over electric automobiles. For example, an air powered automobile can be recharged in seconds at a charging station equipped with large air tanks. It is also capable of much greater acceleration. Moreover, an air powered automobile does not require periodic recycling of key components, as do lead acid battery powered electric automobiles.

Automobiles in accordance with present invention may also be equipped with a small gasoline powered air compressor. This would be useful in areas not equipped with charging stations. Although such an automobile would not be non-polluting, it would get greater gas mileage than a gasoline powered car. The reason for this is that the smaller gas motor would run at full throttle most of the time, which is more efficient than running a larger motor throttled down. Peak acceleration could be made up for by stored air that was previously compressed.

The present compressor may also be used in aerospace applications and, more particularly, in manned operations such as the space shuttle. The space shuttle employs two very heavy power devices, a fuel cell and a large hydraulic pump. The fuel cell takes hydrogen and oxygen from liquid storage tanks on the shuttle and converts these gasses into water and electricity. The electricity is used to power computers and a large hydraulic pump which operates the shuttle's landing gear, bay doors, and control surfaces. In parallel, oxygen is boiled off from the shuttle's liquid storage tanks to provide breathing air for the crew. The present compressor, when coupled with a pair of compressed air motors, could convert liquid oxygen into cabin air while driving a small generator for the computers and directly driving the hydraulic pump. This arrangement could prove lighter than the current system.

Submarines, especially smaller non-nuclear submarines, could also include the present compressor because they already store compressed air. The device could be used to drive the propeller and/or a pump to exhaust stale cabin air in small submarines. However, the device would only be practical when the outside pressure is much lower than the pressure in the sub's air storage tanks (this limitation applies to diesel engines as well). The present compressor's high power to weight/volume ratio may prove attractive to submarine designers.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

FIG. 4b is a partial section view of a portion of the valve shown in FIG. 4a.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention. The scope of the invention is defined by the appended claims.

Figure 1:
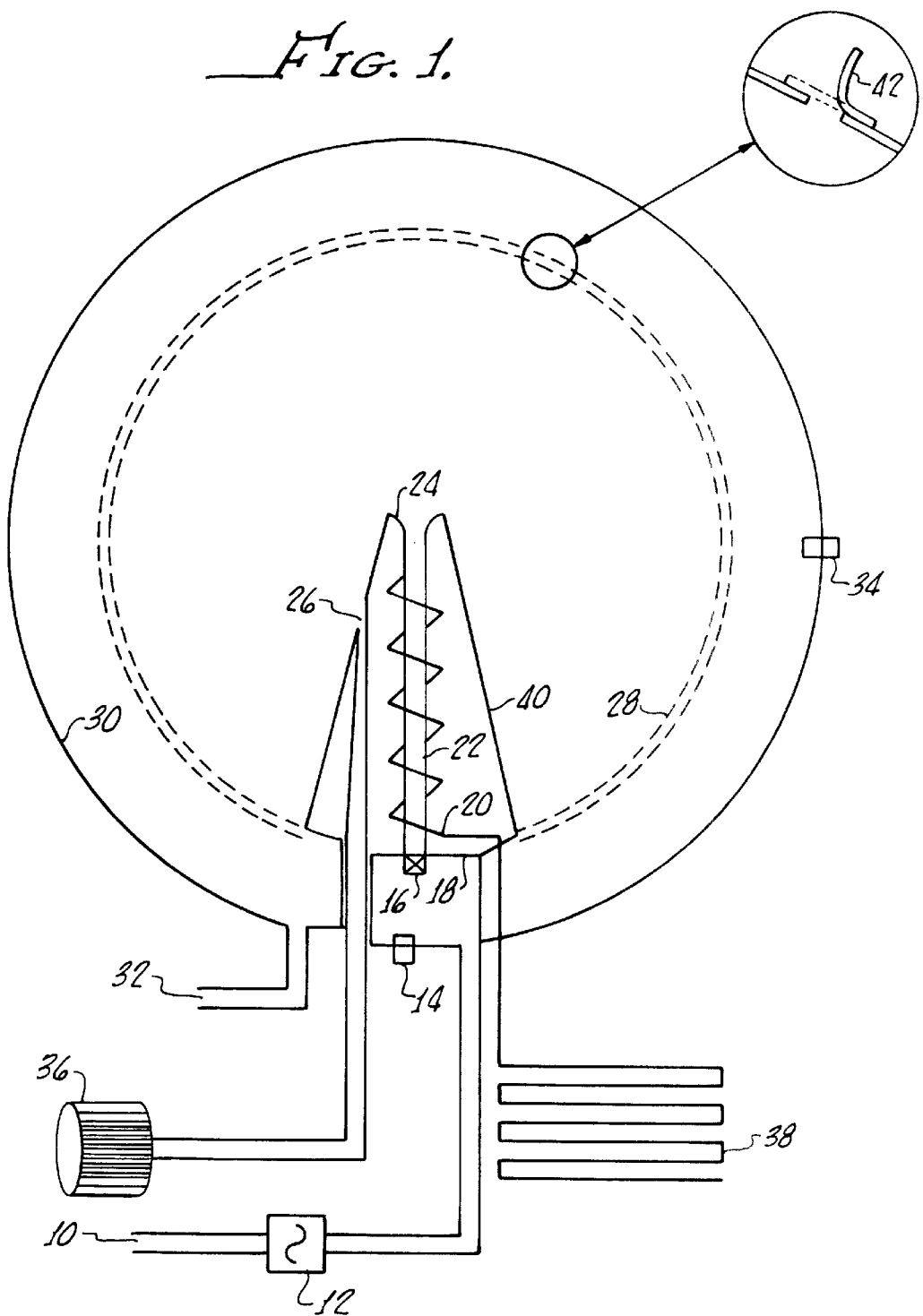
FIG. 1 is a side, partial section view of a compressor in accordance with a preferred embodiment of the present invention.

As shown by way of example in FIG. 1, a compressor in accordance with a first embodiment of the present invention receives gas, such as air, from a high pressure gas source (not shown) by way of an inlet 10. A flow meter 12 and pressure meter 14 may be used to monitor the intake of gas from the high pressure source. When used, the optional flow meter 12 and pressure meter 14 are connected to an electronic controller (not shown) which monitors the efficiency of the compressor and adjusts the frequency of the standing wave. A high speed valve 16, which is located in a housing 18, allows brief (on the order of 100 microseconds in the exemplary embodiment) pulses of gas to pass from the inlet 10 to an expansion tube 22. The brief pulses are repeated at a regular rate (on the order of 500 Hz in the exemplary embodiment) that may be adjusted by the electronic controller. It is preferable that the width of the pulses also be controllable in order to control the output power of the compressor. Exemplary valves are discussed in detail below with reference to FIGS. 3 and 4.

The exemplary expansion tube 22 is preferably formed from copper or aluminum because of the heat transfer properties of these materials. The expansion tube is relatively thick and has a small hole running the length thereof. The walls of the hole should be extremely smooth to minimize viscous friction. The end of the hole adjacent to the valve 16 is smaller than the opposite end, which swells like a trumpet horn to form a launching section 24. The curvature of the launching section depends on the angle of conical shell 40. More specifically, the curvature is such that the launching section 24 will launch a supersonic pulse of air into an even cone or sphere shaped wavefront over the arc length of the conical shell 40.

The optimum size and shape of the expansion tube 22 depends on a number of factors. Thermal conduction is responsible for a large percentage (potentially up to one-half to two-thirds) of the output power of the compressor. The longer and narrower the tube is, the better the thermal conduction to the gas will be. However, as the length increases and the width decreases, the losses due to viscous friction increase. If the tube is too wide, the flow will break up into turbulence and increase the friction losses. The rate at which diameter increases with length determines where the gas expands and where it will need heat. The cross-sectional area of the tube at its narrowest point is proportionate to the output power of the compressor. The narrow pulse generated by valve 16 will spread somewhat in the tube. The longer the tube, the more the spread. The optimum combination of variables will depend upon user preference. If narrow tubes are desired, several can be arranged in parallel and joined at the launching section 24. If viscous friction is found to be more damaging than thermal conduction, a zero length tube can be used.

The closer to ambient temperature the expansion tube 22 is, the more efficient the compressor will be. As the expansion tube 22 will run cold as gas expands therein, it may be wrapped with thermal conductor 20 which acts as a heat pipe and passes heat from a radiator 38 to the expansion tube. Both the thermal conductor 20 and radiator 38 are optional, but nevertheless desirable, for high powered compressors.

In the exemplary embodiment illustrated in FIG. 1, the expansion tube 22 and conical shell 40 are located within a resonance chamber 28 that is a section of a spherical shell. The center of the sphere is located close to the launching section 24. The surface of the shell is covered with a plurality of flap valves 42, preferably enough to cover the entire surface. The flap valves allow air to pass out of the chamber 28 and into an accumulator 30. The valves also prevent the air from returning to the chamber 28. The flap valves should be light, yet strong enough to prevent air at the peak output pressure (150 PSI in the exemplary embodiment) from returning to resonance chamber. The exemplary conical shell 40, the base of which joins the spherical shell to form the resonance chamber 28 and the point of which joins the launching section 24, is formed from strong, rigid material that will contain the standing wave without interacting with it. The walls of the conical shell 40 are preferably radial to the spherical shell. The efficiency of the compressor may be increased by reducing the thermal conductivity of the conical shell.

Although the exemplary accumulator 30 is spherical, it may be any shape. However, the accumulator must surround the entire working surface of the chamber 28 and be strong enough to contain the compressor's peak output pressure. The accumulator is also preferably insulated to prevent the adiabatically compressed air from cooling. When the valve 16 is to be operated in variable duty cycle mode, the accumulator 30 buffers the output demand while valve 16 is off.

As illustrated for example in FIG. 1, ambient air passes into the chamber 28 through an inlet aperture 26 and filter 36 to replace the air which passes through the flap valves. Because even a small percentage of the acoustic energy in the chamber would create a sizable noise pollution problem, the aperture 26 should also keep the acoustic wave within the chamber from exiting. This may be accomplished through the use of a flap valve, such as that discussed above, over the aperture 26. Alternately, a narrow slit connected to a tuned resonance pipe may be used. The tuned pipe would present a high impedance at the compressor's operating frequency. The air delivered by aperture 26 must circulate in chamber 28 to prevent the formation of cold spots.

The exemplary embodiment illustrated in FIG. 1 also includes an output port 32 which connects the accumulator 30 to the device requiring the lower pressure compressed air. Preferably, the storage volume of the accumulator 30 is such that the demand at the output port may briefly exceed the power rating of the expansion tube 22. In an automotive application, for example, the additional supply of air may be used for peak acceleration. A pressure sensor 34 may also be provided within the accumulator 30. The pressure sensor is connected to the control electronics to regulate the output pressure. The pressure within the accumulator 30 will increase in small steps at the resonance rate of chamber 28. A sensor which can read these steps can also be used to track system efficiency.

Figure 2:
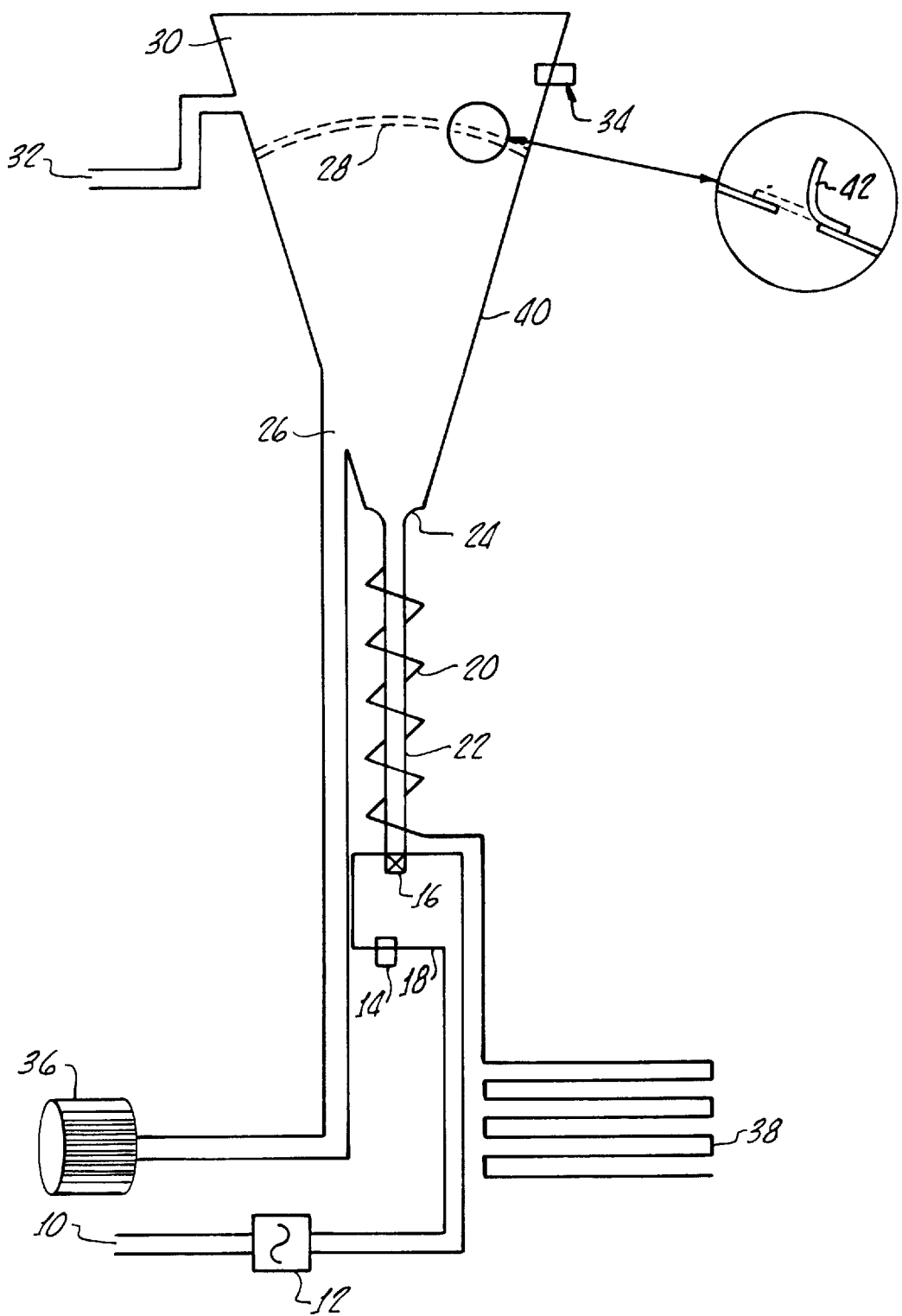
FIG. 2 is a side, partial section view of a compressor in accordance with a second preferred embodiment of the present invention.

Another exemplary embodiment of the present invention is illustrated, for example, in FIG. 2. Here, the interior of a conical shell 40' is the resonance chamber 28'. The other elements of the apparatus are essentially the same as those shown in FIG. 1 and are correspondingly numbered.

The exemplary embodiments illustrated in FIGS. 1 and 2 operate in the following manner. High pressure air (3000 PSI in the exemplary embodiments) enters high speed valve 16. Brief pulses (on the order of 100 to 200 microseconds) of gas are allowed to pass into expansion tube 22. In the expansion tube, the gas expands and cools as its pressure is converted to velocity. The cooler gas is warmed by contact with the tube and the heat adds to its velocity. At the far end of the tube, the kinetic energy of the puff of gas is equal to the potential energy of the gas before expansion minus two factors. The first factor allows for viscous friction with the walls of the tube. The second factor allows for the thermal resistance between the gas and the tube. The governing equations are:

(1) Potential energy (isothermal)=volume * pressure * In (high pressure/ambient pressure), and (2) Kinetic energy=volume * density * velocity$^2$/2, where volume is in cubic meters, pressure is in Pascals, velocity is in meters per second, and density is in KG/M$^3$.

When the puff of high velocity gas reaches launching section 24, it is dispersed into a conical or spherical wave front. The puff compresses the ambient air in front of it and looses momentum in the process. The ambient air enters the resonance chamber though the inlet 26.

At some point, the momentum of the original puff of gas will have been transferred to the compressed air surrounding it. At this point the wave front becomes an acoustical wave. In an acoustical wave, energy is transferred by converting momentum into pressure and then back to momentum. This acoustical wave propagates outward. The propagation of an acoustical wave is usually an energy conserving process. However, the amplitudes generated in the chamber far exceed the requirements for linear acoustics. At these amplitudes, thermal conduction between the hot pressure wave fronts and the cooler surrounding area provides a source of loss and changes the shape of the wave.

When the acoustical wave strikes the outer surface of the chamber 28, the peak pressure of the wave will penetrate the flap valves 42 on the surface and pump air into the accumulator 30. The rest of the energy of the wave, including the portion of the wave which strikes portions of the chamber wall that are not covered by a flap valve, will reflect off the spherical surface and propagate inward. Because the wave's area is larger at the surface of the chamber than it is at the center, the wave's pressure is lower at the surface than it is at the center. As the wave propagates back inwardly, it looses surface area and gains pressure. This is the mechanism that provides the "transformer" effect of the present standing wave compressor. The mass and compressibility of the gas in the chamber are harnessed to provide a continuous expansion motor which transforms the high pressure air at the center to lower pressure air at the perimeter.

When the returning wave approaches the center of the resonance chamber 28, a second puff of gas meets it. The second puff is timed to push on the return wave and add to its energy as it turns around at the center to head back to the perimeter of the spherical resonance chamber. The larger acoustic wave hits the perimeter and forces even more gas through the flap valves. The cycle is continuously repeated. The repetition rate of the high speed valve may be continuously adjusted to give the highest standing wave ratio and, therefore, the best efficiency. Such adjustments can be made by measuring the amplitude of the pulses of air penetrating the chamber wall. The optimum rate depends on factors such as ambient air pressure and humidity.

More air is forced through the resonance chamber wall than enters from the expansion tube. The deficit is made up by air entering through the aperture 26. This will be a more or less continuous stream of air which must circulate around the chamber to prevent the formation of cold air pockets. The low velocity air currents will have little impact on the acoustical wave.

Figure 3:
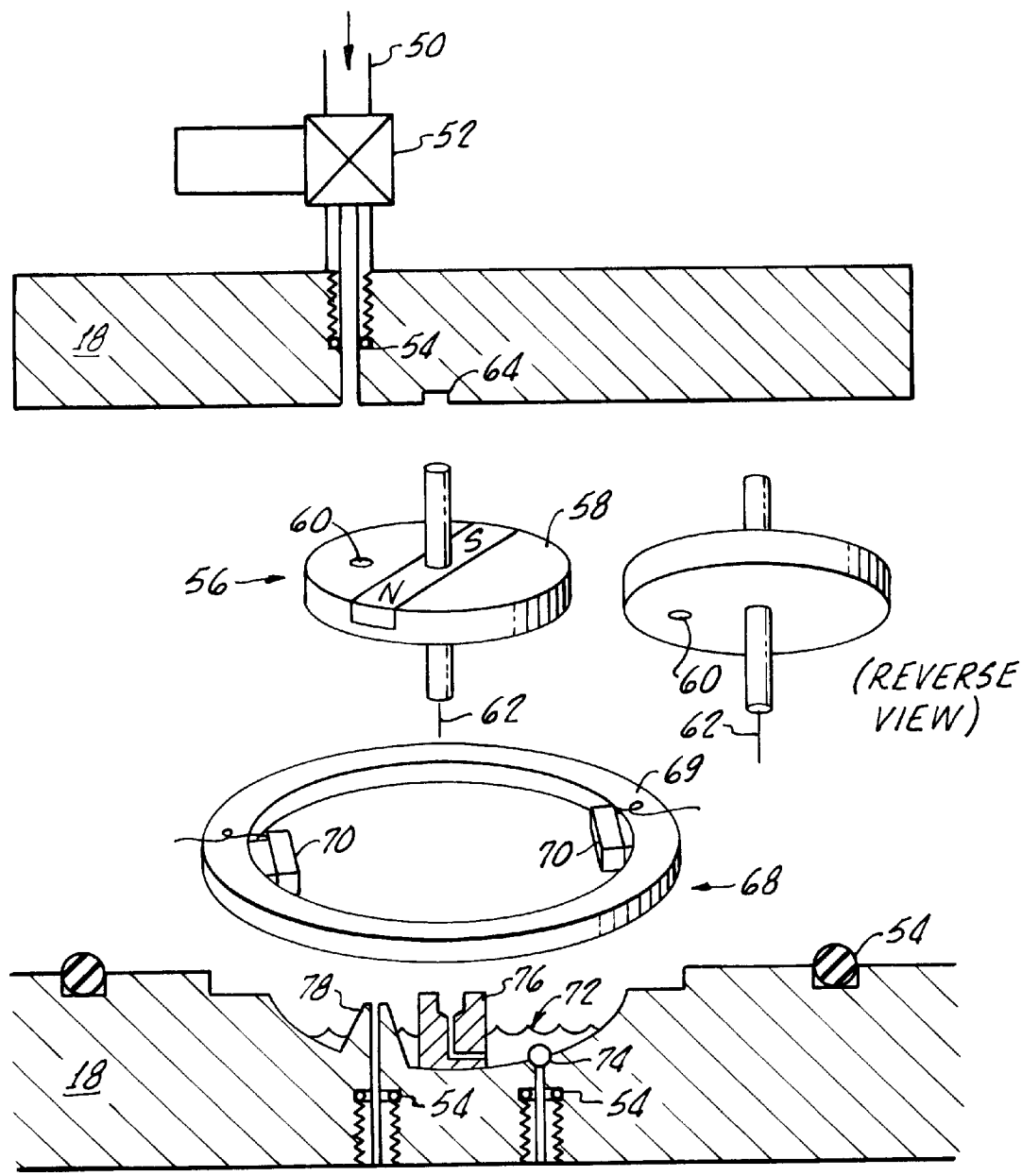
FIG. 3 is an exploded view of a valve which may be used in conjunction with the compressors shown in FIGS. 1 and 2.

An exemplary high speed valve which may be used in conjunction with the present invention is shown FIG. 3. The valve housing 18 (discussed above with reference to FIG. 1) holds the high pressure gas and should be capable of withstanding a separation force of about 200,000 lbs. It is preferably machined from two solid blocks of steel and a two-piece clamp (not shown) holds the housing together. The valve includes an inlet 50 which connects the valve to a source of high pressure gas (on the order of 3000 PSI in the exemplary embodiment). The gas flow is controlled by high pressure solenoid valve 52 such as that commonly used in the hydraulics industry. The speed of valve 52 is measured in fractions of a second. Valve 52 provides a reliable "off" position for the high speed valve. By varying the duty cycle of valve 52, the total output power of the compressor can be controlled. All hose connections in this design are made using o-rings 54.

The exemplary high speed valve shown in FIG. 3 also includes a spindle 56 which is preferably machined from a piece of hard, non-magnetic metal. Titanium and certain grades of stainless steel are suitable. A slot is formed in the upper surface 58 of the disc portion of the spindle. The slot holds a permanent magnet that forms the rotor of an electric motor. A roughly crescent shaped hole 60 passes through the spindle. Although there is only one hole in the exemplary embodiment, more than one may be used. For example, an arrangement of four holes evenly spaced about the perimeter of the spindle may be employed.

A thin capillary tube 62 is located close to the axis of the spindle 56. The bottom of this tube sits below the oil level (note oil pool 72). The top of this tube makes a 90 degree turn onto the underside of the spindle. Centrifugal force will draw oil up the tube and spread it across the underside of the spindle. Grooves (not shown) cut in the underside of the spindle will distribute the oil uniformly before it reaches the hole(s) 60. The underside of the spindle is machined very smooth close to the hole.

Bearings 64 and 76 firmly hold the spindle while allowing it to spin freely. The bearings are preferably precision, low wobble bearings. There will be forces on the spindle approaching 50 lbs. and the underside of the spindle must hold its position very precisely. The spindle bearing structure should remain rigid under this force. The lower bearing has a hole through its center to accommodate the capillary tube 62. A second hole at an angle to the first admits oil to the cavity.

A stator 68 is formed by a ferric ring 69 which surrounds the spindle and by field coils 70 which are preferably oil-tight. This ring 69 includes protrusions through which field coils 70 extend and make close contact with the perimeter of the spindle 56. The stator generates a rotating magnetic field which forces the spindle to rotate. By way of example, three pairs of coils may be connected to a three-phase power supply. The rotation rate of the spindle (and operating frequency of the valve) are controlled by the frequency of this supply.

The exemplary high speed valve shown in FIG. 3 includes a pyramid 78 below the spindle 56. This structure is shaped like a truncated cone and may be carved into the bottom of housing 18. The pyramid 78 has a hole along its length and the top is machined very flat. This hole forms the beginning of the expansion tube 22 shown in FIGS. 1 and 2. The hole in the pyramid aligns with the hole(s) 60 in the spindle at selected angles of rotation. When the holes do not align, the top of the pyramid makes extremely close contact with the underside of the spindle. Oil will fill the gap. It is noteworthy that the final machining of pyramid 78 and the underside of the spindle 56 can be accomplished by running the valve without oil. The surfaces will wear smooth until they no longer contact each other. To maintain this clearance, it is important that the spindle be very rigid, and that the bearings have very little slop.

Oil drips down from the stator ring, pools in the lower section of the housing 18, and is then drawn through the capillary tube 62. A small amount leaves the valve through expansion tube 22. This oil is returned when the solenoid valve is off and the pressure within the housing is close to atmospheric. At this time, oil from the lowest point of accumulator 30 is forced through check valve 74 and into the oil pool. When the housing is pressurized, the check valve prevents oil from leaving through this path.

The exemplary valve shown in FIG. 3 operates in the following manner. The solenoid valve 52 is normally closed and the housing 18 contains only ambient pressure gas and oil. A rotating magnetic field created by the stator 68 causes the spindle 56 to rotate at the driving frequency of stator, thereby forming a synchronous electric motor. Oil, which is drawn through the capillary tube 62 to the underside of the spindle by centrifugal force, spreads uniformly across the spindle disc assisted by centrifugal force, coriolis force, and the grooves in the bottom of the disc. The viscosity of the oil causes it to stick to the disc until it reaches the perimeter. Centrifugal force causes it to fly off and hit the stator. From the stator, the oil drips down to the pool.

When valve 52 is opened, the housing 18 becomes pressurized with high pressure gas. At the high pressure (on the order of 3000 PSI), the density of air (which is one gas that may be used) is approximately 20% of the density of water and viscous friction is a serious problem. The magnetic field strength of stator and rotor must be strong enough to overcome this friction. When the hole in the spindle does not line up with the hole in the pyramid, air is prevented from leaving by a thin film of oil between the pyramid and the spindle. Under the force of the gas pressure, the oil moves slowly towards the pyramid hole. Oil lost in this way is quickly replaced by fresh oil migrating outwardly across the disc. The oil speed is limited by viscous friction and the small cross sectional area between the two parts.

When the spindle hole lines up with the pyramid hole, the valve is open and high pressure gas passes to the expansion tube 22. The crescent-like shape of the spindle hole keeps the valve wide open for a small angle of rotation of the spindle. During this time, the pressure difference between the ambient air in the resonance chamber 28 and the compressed gas in the housing 18 accelerates the gas in the tube to supersonic speeds. The duration of this pulse is determined by the arc width of the spindle hole and the rotation speed of the spindle. For example, the pulse width may be 10% of the pulse period.

As noted above, a small amount of oil is blown through the tube with the gas. This oil will eventually settle in the lowest point of accumulator 30. Since accumulator 30 is pressurized at up to 150 PSI, oil is propelled from this lowest point back to the oil pool 72 when solenoid 52 is off. When solenoid valve 52 is open, the high speed valve must operate from the oil stored in the pool. Therefore, there is a maximum duration that solenoid 52 can be open. If the standing wave compressor is operated in duty cycle control mode, the maximum duration experienced will be a few seconds. This will not require an unusually large pool.

Figure 4A:
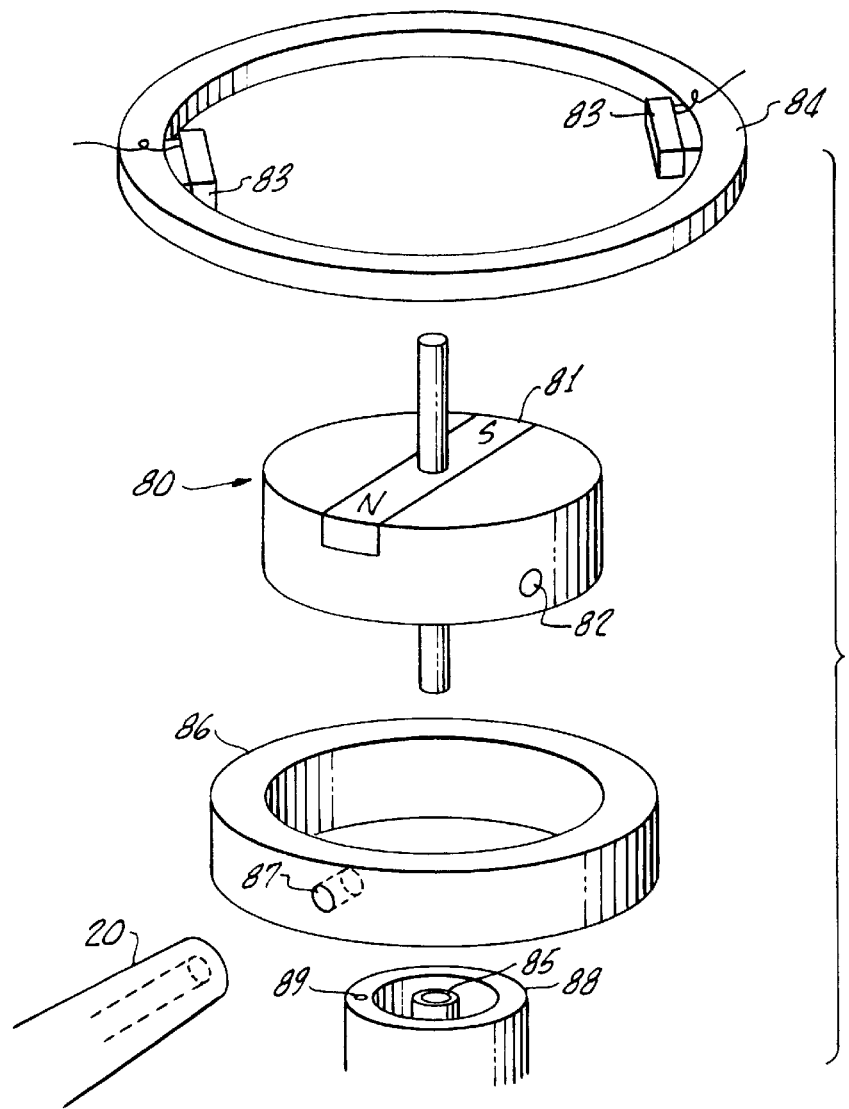
FIG. 4a is an exploded view of another valve which may be used in conjunction with the compressors shown in FIGS. 1 and 2.
Figure 4B:
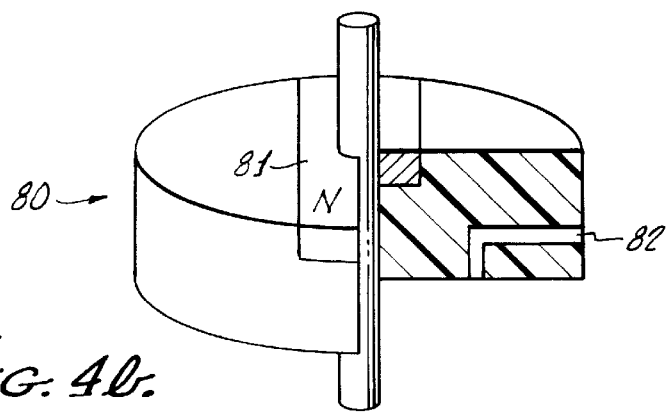

Another exemplary valve, which is particularly useful in those instances where liquid nitrogen is used to generate the pulse of high velocity compressed gas, is shown in FIGS. 4*a* and 4*b*. The valve includes a rotating spindle 80 having a magnet 81 and an aperture 82. A series of coils 83 on a ring 84 generate a rotating magnetic field that causes the spindle, which is mounted on an upper bearing (not shown) and a lower bearing 85, to rotate. In the exemplary embodiment, the spindle rotates at approximately 500 rotations per second. This process generates heat and, therefore, should be insulated from the rest of the assembly. Preferable coil and ring materials include copper windings and transformer grade magnetic steel. The spindle 80 is preferably formed from low temperature plastic. The bottom and radial surface must be smooth.

The spindle rotates within an annulus 86 that includes an aperture 87 which is aligned with the spindle aperture 82 once per revolution. When the apertures are aligned, the liquid nitrogen enters the expansion tube 20. The aperture is angled such that the nitrogen does not contact the annulus, but does contact the expansion tube. The annulus is also preferably formed from low temperature plastic. The spindle receives the liquid nitrogen through a feed ring 88 which is also preferably formed from low temperature plastic and should also be insulated. Liquid nitrogen is fed through a aperture 89 in the feed ring. When the feed ring and spindle apertures are aligned, the spindle draws liquid nitrogen its aperture. When the spindle and feed ring apertures are not aligned, the nitrogen is confined to the feed ring.

During operation, liquid nitrogen is drawn up the aperture 82 by centrifugal force and forced toward the end of the aperture associated with the radial surface. When the apertures in the spindle and annulus are aligned, liquid nitrogen expelled by centrifugal force into the expansion tube 20. The expansion tube is preferably made from aluminum and held at close to ambient temperature. When the liquid nitrogen makes contact with the tube, it boils explosively and generates a high pressure gas. The annulus seals this high pressure in at the entrance to the tube because the spindle and annulus apertures are only aligned for an instant. The cold boiling gas is forced down the expansion tube rapidly where it becomes a pulse of high velocity compressed gas. This drives the standing wave compressor.

It should be noted that this structure will run cold and that the valve must be able to accommodate the stresses caused by low temperatures. There will be some blow by the annulus ring/spindle outer surface seal. This must be safely vented. The amount of liquid nitrogen which will be fed to the standing wave compressor depends on the size of the holes and on the pressure of the liquid nitrogen. Output power can be controlled by throttling the liquid nitrogen.

Figure 5:
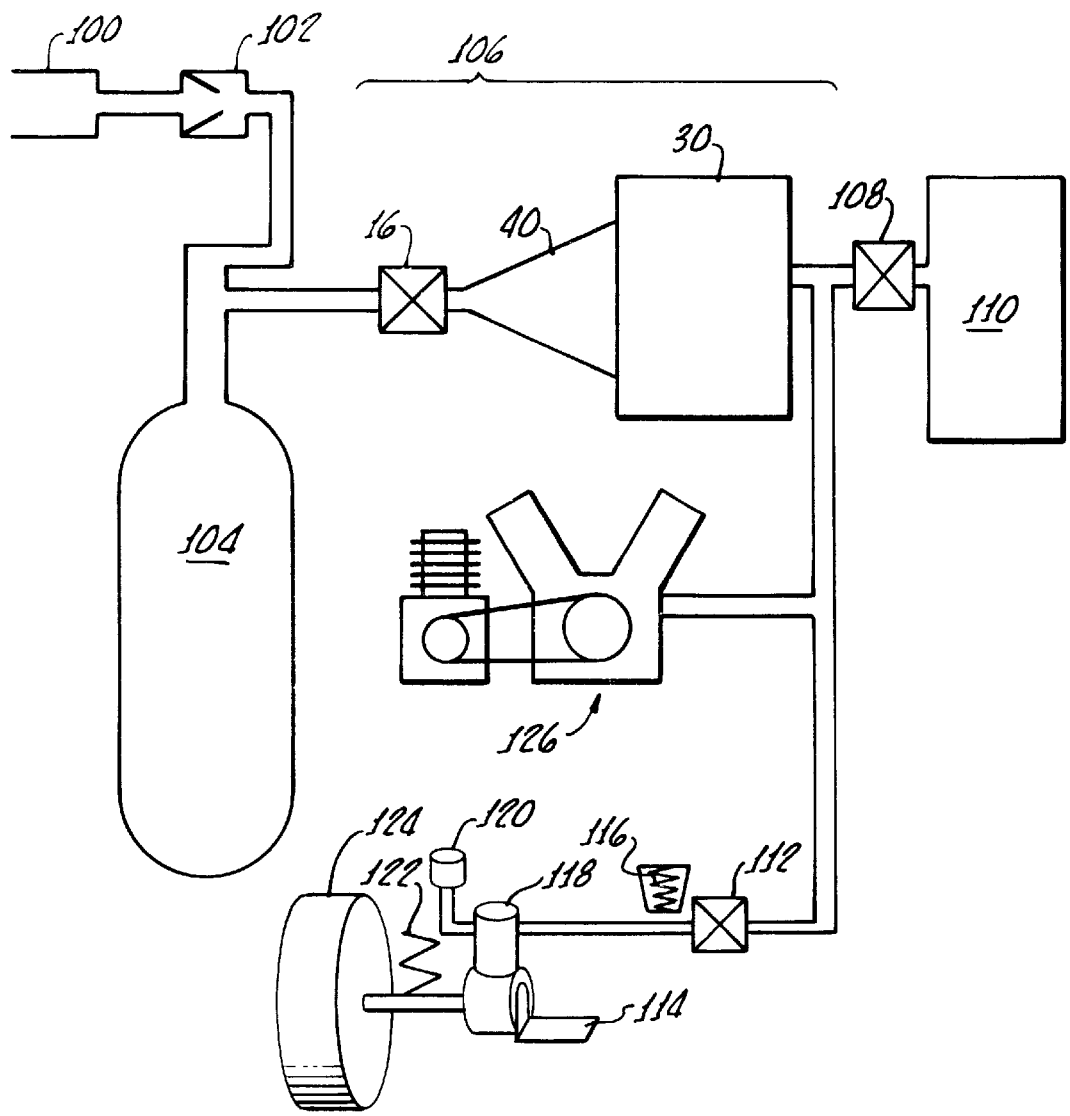
FIG. 5 shows an automotive power system in accordance with the present invention.

FIG. 5 is a schematic representation of an exemplary automotive power plant in accordance with the present invention. A quick disconnect 100 and check valve 102 are used to connect high pressure power plant storage bottles 104, such as K bottles, to a charging station. The charging process is discussed below. The storage bottles 104 are connected to a standing wave compressor 106. The compressor 106 includes a relatively large (approximately 10 gallons in the exemplary embodiment) accumulator and is adjustable to provide output pressures from ambient up to 150 PSI. The output pressure from the compressor 106 feeds a secondary air system. At 140 PSI, the accumulator holds 100 horsepower seconds of energy. A second accumulator 110, which is preferably 20 gallons in volume, holds an additional 200 horsepower seconds of energy. The second accumulator 110 is switched into the system by a valve 108 that is controlled by the operator and may be used when extra energy is desired such as, for example, during acceleration and deceleration.

In the exemplary embodiment, each wheel includes its own drive system, which gives four-wheel braking and acceleration. The extra cost of four motors is offset by the fact that each motor is one-fourth the size of the motor that would otherwise by necessary. The four motor design eliminates the need for a differential, transmission, and traditional braking system. Each of the drive systems also includes an ordinary vehicle suspension 122, consisting of a spring and shock absorber, and an ordinary vehicle wheel 124 with appropriate tread.

The exemplary drive systems each include a solenoid valve 112 which is intended to be open at all times except during parking and panic stops. Since the force from the energy recovery braking system depends on the pressure in the accumulator, a panic stop mechanism is necessary for safe driving. The panic stop mode does not recover energy. Each system also includes an efficient compressed air motor 118 that has at least three modes of operation—forward, reverse, and neutral. The modes can be controlled by controlling the valves which connect the cylinder to its ports. In addition, it is desirable to be able to control how much air the motor takes in on each intake stroke. This gives control over the motor's output without having to regulate the air pressure, which will change slowly. Although not extremely efficient or powerful, standard air powered drill motors are one example of an air powered motor that has all of these characteristics. The automated assembly equipment industry also uses a wide variety of moderate air pressure powered equipment. The motor shell is connected to the vehicle frame by a flexible connector 114 that allows the motor 118 to move with the drive wheel and pass torque to the frame.

A regulator 116 bleeds air from the motor if it exceeds a preset pressure (about 200 PSI). This pressure represents the greatest torque that the motor 118 could sustain on drive wheel 124 without causing it to slide on dry concrete. An additional mechanism (not shown) could provide a parallel bleed path if wheel 124 stops rotating. This would act as an anti-lock brake mechanism. Each motor 118 is connected to an exhaust vent 120. Since the exhaust vent will also be an intake vent during braking, it should include a filter.

An ordinary gasoline powered air compressor 126 may be added to the system so as to allow operation in areas where high pressure air (or other gas) is not available. The compressor must be about 10 HP and capable of up to 150 PSI operation. Automotive industry regulations may require some emissions control equipment on the compressor. This option also adds several thousand pounds of weight. The intent is that a user would use compressed air for the daily commute and gasoline for occasional jaunts outside the compressed air distribution system.

With respect to charging, the quick disconnect 100 may be used to connect the K bottles 104 to a charging station, such as those used to charge diver's bottles. These stations consist of a high pressure compressor connected to a number of high volume storage bottles. Once connected, air flows rapidly from the bottles in the charging station to the K bottles 104. When the quick disconnect 100 is disconnected, the check valve 102 blocks the flow of air out the charging port. The K bottles 104 then hold the high pressure air which will power the automobile.

The charging time is on the order of seconds after the connection is made. The quick disconnect must be a foolproof mechanism that will not pressurize unless mated properly. All hoses connecting the charging station bottles to the K bottles are preferably high pressure ½ inch inside diameter. The ½ inch gauge permits rapid charging. The check valve 102 is also preferably ½ inch diameter high pressure rated. Suitable hoses and check valves are commercially available in the hydraulics industry. The quick disconnect may be similar to those used for diver's bottles with some added safety interlocks.

The K bottles are preferably either diver's type bottles or industrial bottles, formed from steel or aluminum, and designed for pressures ranging from 2250 PSI to 6000 PSI. The diver's bottles are lighter per unit volume, but may have a shorter life span, while the industrial bottles have an unlimited life span. Since the range of the vehicle will be proportionate to the stored volume of air, the vehicle will contain as many of these bottles as possible. An exemplary power plant includes sixty 80 cubic foot diver's bottles, which together weigh 2100 lbs. empty and occupy a space 5 feet by 4 feet by 40 inches or the equivalent. As such, they will fit nicely in the back of a station wagon or pickup truck. The theoretical energy storage of these bottles is just under 28 horsepower hours. Allowing for 50% efficiency losses, this provides a freeway range of 1.5 hours or 90 miles. The city driving range could be almost four times as much due to energy recovery brakes and lower speeds. Also, lighter bottles can be developed which could double or triple the vehicle's range.

During operation of the exemplary automotive power plant, the primary energy path is from K bottles 104 to the compressor 106 and then to the motors 118. The compressor 106 is computer regulated to a pressure controlled by the driver. The driver also controls secondary storage valve 108. In city traffic or normal freeway travel, the valve 108 is closed.

When the driver wishes to accelerate, all four motors are switched to the forward position. If the motors do not have a variable power option, the acceleration is proportionate to the secondary pressure. The secondary pressure is set by the driver, but can only be changed slowly, on the order of a few seconds. The switching of the motor from neutral to forward can be done very rapidly. When the vehicle reaches its cruising speed, the driver will either reduce the secondary pressure, begin pulsing the motors from forward to neutral, or throttle down the motors. Deceleration is accomplished by switching the motors to reverse. Because the motors are rotating forward, the motors provide a braking force by compressing ambient air and returning it to the accumulator. As there is no wasted energy, the motors will not heat up beyond the temperature of the adiabatically compressed air. The braking force will be about the same as the accelerating force at that pressure and the braking energy can be harnessed by switching the motors to forward and using the energy stored in the accumulator.

When braking on a long hill or about to accelerate up a freeway on ramp, the valve 108 is opened to store or provide additional energy. If the energy absorbed exceeds the capacity of storage tank 110, the regulators 116 will bleed the excess air to the atmosphere and dissipate the energy as hot vented air. If a panic stop is required, the motors are switched to reverse and solenoid valves 112 are closed. The pressure in the lines will soar rapidly to the regulator pressure which controls the maximum braking force. Air will escape through the regulators 116 and the motors 118 will provide the right amount of torque to bring the vehicle to a stop as soon as possible. An additional anti-lock mechanism (not shown) could release further air from a motor if it detects that the associated wheel is skidding. When the vehicle is powered off and parked, the solenoid valve 112 will also be closed preventing the wheel from moving.

Reverse gear is accomplished in the same manner as non-panic stop braking. More specifically, if the brake is kept on after the vehicle comes to a full stop, the braking force will begin to accelerate the vehicle backwards. Since the wheel is turning in the direction of the force, the motors will be consuming air from the accumulator and releasing it to atmosphere again. Braking in reverse is accomplished the same way as forward acceleration and air is returned to the accumulator, thereby saving the energy for later acceleration.

The energy recovery brakes can be shown to give this vehicle almost four times the range for city driving as for freeway driving. The reason for this is that the kinetic energy of the vehicle is a one time investment rather than a repeat cost. The friction losses, however, will be about a quarter as much per mile because the viscous friction energy loss (wind resistance) is proportionate to velocity squared. City driving speeds are about 30 MPH while freeway driving is around 60 MPH. This gives ¼ the energy loss for city driving as for freeway.

The present invention is not only susceptible to use with automobiles. Note that if elements 108–116 and 122–126 are omitted, the illustrated power plant becomes a general purpose power plant. This could be used to turn the propeller on a small high powered submarine or a hydraulic pump on the space shuttle. The present system is portable, high powered, lightweight except for the storage bottles, and non-polluting. It can also be used to power a portable electric generator usable indoors or a backup generator on a space station. Any portable mechanism that needs to generate mechanical energy is a good application for this technology.

Although the present invention has been described in terms of the preferred embodiment above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

I claim:

1. A compressor, comprising:
   a chamber having a standing acoustical wave therein, the wave having at least first and second differently sized velocity nodes, the first velocity node being smaller than the second velocity node;
   a high pressure inlet adapted to receive one of a relatively high pressure gas and a liquefied gas;
   an inlet mechanism operably connected to the high pressure inlet and to the chamber, the inlet mechanism being associated with the first velocity node and adapted to supply pulses of the relatively high pressure gas to the chamber at a predetermined rate;
   at least one outlet valve associated with the second velocity node of the chamber and adapted to allow gas at a relatively low pressure to pass therethrough; and
   a low pressure inlet operably connected to the chamber.

2. A compressor as claimed in claim 1, wherein the inlet mechanism comprises an inlet valve, the inlet valve including a housing having a housing inlet and a housing outlet and a rotatable member within the housing, the rotatable member having at least one aperture passing therethrough which aligns with the housing inlet and housing outlet at predetermined intervals.

3. A compressor as claimed in claim 2, wherein the rotatable member includes a magnet and the inlet valve further comprises an apparatus adapted to provide a magnetic field to drive the rotatable member.

4. A compressor as claimed in claim 2, wherein the rotatable member is mounted for rotation in a bearing structure.

5. A compressor as claimed in claim 2, wherein the inlet mechanism further comprises an expansion tube extending from the inlet valve to a predetermined point within the interior of the chamber.

6. A compressor as claimed in claim 5, wherein the expansion tube comprises a first longitudinal end portion associated with the inlet valve and a second longitudinal end portion defining an outwardly curved launching section.

7. A compressor as claimed in claim 6, further comprising:
a substantially frusto-conical member within the chamber and having a first longitudinal end defining a smaller diameter than a second longitudinal end, the first longitudinal end being associated with the launching section.

8. A compressor as claimed in claim 5, further comprising:
a thermal conductor associated with the expansion tube.

9. A compressor as claimed in claim 8, further comprising a radiator operably connected to the thermal conductor.

10. A compressor as claimed in claim 1, wherein the at least one outlet valve comprises a plurality of outlet valves.

11. A compressor as claimed in claim 1, wherein the at least one outlet valve comprises a flap valve.

12. A compressor as claimed in claim 1, further comprising:
an accumulator adapted to receive gas from the at least one outlet valve.

13. A compressor as claimed in claimed 12, wherein the chamber defines an exterior and the accumulator substantially surrounds a substantial portion of the chamber exterior.

14. A compressor as claimed in claim 12, further comprising:
an outlet port operably connected to the accumulator.

15. A compressor as claimed in claim 1, wherein the chamber defines a substantially spherical shape.

16. A compressor as claimed in claim 1, wherein the chamber defines a substantially conical shape.

17. A compressor as claimed in claim 1, wherein the inlet mechanism comprises an inlet valve, the inlet valve including a feed ring having an aperture, an annular member having an aperture and a rotatable member having at least one aperture passing therethrough which connects the feed ring aperture to the annular member aperture at predetermined intervals.

18. A compressor as claimed in claim 17, wherein the rotatable member includes a magnet and the inlet valve further comprises an apparatus adapted to provide a magnetic field to drive the rotatable member.

19. A compressor as claimed in claim 17, wherein the rotatable member is mounted for rotation in a bearing structure.

20. A vehicle, comprising:
at least one container having a supply of compressed air therein;
a compressor including
a chamber having a standing acoustical wave therein, the wave having at least first and second differently sized velocity nodes, the first velocity node being smaller than the second velocity node,
a high pressure inlet adapted to receive one of a relatively high pressure gas and a liquified gas,
an inlet mechanism operably connected to the high pressure inlet and to the chamber, the inlet mechanism being associated with the first velocity node and adapted to supply pulses of the relatively high pressure gas to the chamber at a predetermined rate,
at least one outlet valve associated with the second velocity node of the chamber and adapted to allow gas at a relatively low pressure to pass therethrough,
a low pressure inlet operably connected to the chamber, and
an outlet port operably connected to the at least one outlet valve; and
at least one propulsion device operably connected to the outlet port of the compressor.

21. A vehicle as claimed in claim 20, wherein the at least one propulsion device comprises at least one wheel and a compressed air operably connected to the outlet port of the compressor and adapted to drive the at least one wheel.

22. A vehicle as claimed in claim 20, wherein the compressed air motor comprises a reversible compressed air motor.

23. A compressor, comprising:
a chamber having a standing acoustical wave therein, the wave having at least first and second differently sized velocity nodes, the first velocity node being smaller than the second velocity node;
a high pressure inlet adapted to receive a relatively high pressure gas;
an inlet mechanism operably connected to the high pressure inlet and to the chamber, the inlet mechanism being associated with the first velocity node and adapted to supply pulses of the relatively high pressure gas to the chamber at a predetermined rate;
at least one outlet valve associated with the second velocity node of the chamber and adapted to allow gas at a relatively low pressure to pass therethrough; and
a low pressure inlet operably connected to the chamber.

24. A compressor as claimed in claim 23, wherein the inlet mechanism comprises an inlet valve, the inlet valve including a housing having a housing inlet and a housing outlet and a rotatable member within the housing, the rotatable member having at least one aperture passing therethrough which aligns with the housing inlet and housing outlet at predetermined intervals.

* * * * *